United States Patent
Kuwayama et al.

(10) Patent No.: US 12,411,497 B2
(45) Date of Patent: Sep. 9, 2025

(54) INFORMATION PROCESSING APPARATUS, METHOD, AND NON-TRANSITORY COMPUTER READABLE MEDIUM

(71) Applicant: TOYOTA JIDOSHA KABUSHIKI KAISHA, Toyota (JP)

(72) Inventors: Yuki Kuwayama, Yokohama (JP); Takeshi Fujiki, Shinagawa-ku (JP); Rie Murai, Chiba (JP); Kohei Miwa, Suntoh-gun (JP); Akira Miyamoto, Nisshin (JP); Tsuyoshi Okada, Nagoya (JP); Yu Ito, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 214 days.

(21) Appl. No.: 18/340,434

(22) Filed: Jun. 23, 2023

(65) Prior Publication Data

US 2023/0418306 A1 Dec. 28, 2023

(30) Foreign Application Priority Data

Jun. 23, 2022 (JP) .................................. 2022-101394

(51) Int. Cl.
| | |
|---|---|
| G05D 1/00 | (2024.01) |
| A01B 76/00 | (2006.01) |
| B64D 3/00 | (2006.01) |
| B64U 10/14 | (2023.01) |
| B64U 101/00 | (2023.01) |

(52) U.S. Cl.
CPC ............ G05D 1/028 (2013.01); A01B 76/00 (2013.01); B64D 3/00 (2013.01); B64U 10/14 (2023.01); *B64U 2101/00* (2023.01)

(58) Field of Classification Search
None
See application file for complete search history.

(56) References Cited

U.S. PATENT DOCUMENTS

| | | | |
|---|---|---|---|
| 2019/0197497 A1* | 6/2019 | Abari | ................... G05D 1/0088 |
| 2020/0331547 A1* | 10/2020 | Kowalchuk | ............. B60K 1/00 |
| 2022/0032909 A1 | 2/2022 | Kyle et al. | |
| 2022/0357164 A1 | 11/2022 | Fukuhara et al. | |
| 2023/0368673 A1* | 11/2023 | Rusciano | ............. G08G 1/0137 |

FOREIGN PATENT DOCUMENTS

| | | | |
|---|---|---|---|
| EP | 3459788 A1 * | 3/2019 | |
| JP | 2019-170228 A | 10/2019 | |
| JP | 2021-153421 A | 10/2021 | |
| JP | 2022-028560 A | 2/2022 | |
| WO | 2021/171539 A1 | 9/2021 | |
| WO | WO-2021231984 A1 * | 11/2021 | ........... A01B 69/008 |

OTHER PUBLICATIONS

Isermann, R. (2005). Fault-diagnosis systems: an introduction from fault detection to fault tolerance. Springer Science & Business Media. (Year: 2005).*

* cited by examiner

*Primary Examiner* — Hitesh Patel
*Assistant Examiner* — Tabitha Kress
(74) *Attorney, Agent, or Firm* — Oliff PLC

(57) ABSTRACT

A controller of an information processing apparatus is configured to control a vehicle to drive automatically by communicating with the vehicle via a communication interface, the vehicle being capable of towing a work vehicle and of driving automatically on public roads.

20 Claims, 3 Drawing Sheets

INFORMATION PROCESSING APPARATUS, METHOD, AND NON-TRANSITORY COMPUTER READABLE MEDIUM

CROSS-REFERENCE TO RELATED APPLICATION

This application claims priority to Japanese Patent Application No. 2022-101394 filed on Jun. 23, 2022, the entire contents of which are incorporated herein by reference.

TECHNICAL FIELD

The present disclosure relates to an information processing apparatus, a method, and a non-transitory computer readable medium.

BACKGROUND

Patent Literature (PTL) 1 discloses a work vehicle with an automatic steering function.

CITATION LIST

Patent Literature

PTL 1: JP 2021-153421 A

SUMMARY

Conventional technology has room for improvement in terms of causing work vehicles to drive on public roads between, for example, a shed for storing work vehicles and agricultural land, such as rice paddies or fields.

It would be helpful to improve technology for causing work vehicles to drive on public roads.

An information processing apparatus according to an embodiment of the present disclosure includes a controller and a communication interface, wherein
  the controller is configured to control a vehicle to drive automatically by communicating with the vehicle via the communication interface, the vehicle being capable of towing a work vehicle and of driving automatically on public roads.

A method according to an embodiment of the present disclosure is a method to be executed by an information processing apparatus and includes:
  controlling a vehicle to drive automatically by communicating with the vehicle, the vehicle being capable of towing a work vehicle and of driving automatically on public roads.

A non-transitory computer readable medium according to an embodiment of the present disclosure stores a program configured to cause a computer to perform operations including:
  controlling a vehicle to drive automatically by communicating with the vehicle, the vehicle being capable of towing a work vehicle and of driving automatically on public roads.

According to an embodiment of the present disclosure, technology for causing work vehicles to drive on public roads can be improved.

DETAILED DESCRIPTION

Hereinafter, an embodiment of the present disclosure will be described.

Figure 1:
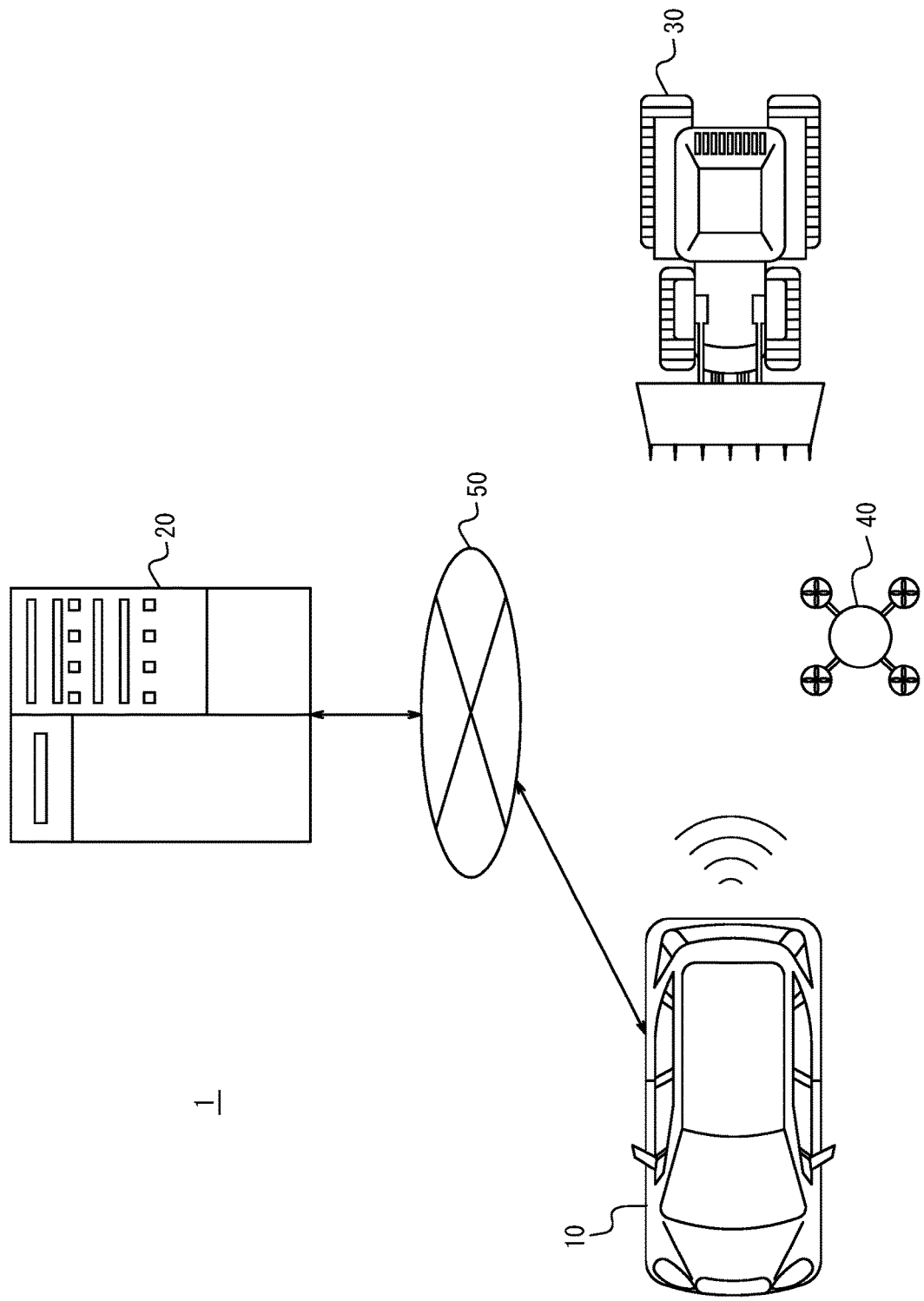
FIG. 1 is a block diagram illustrating a schematic configuration of a system according to an embodiment of the present disclosure.

An outline of a system 1 according to an embodiment of the present disclosure will be described with reference to FIG. 1.

The system 1 includes a vehicle 10, an information processing apparatus 20, a work vehicle 30, and an unmanned aircraft 40. The vehicle 10, the information processing apparatus 20, the work vehicle 30, and the unmanned aircraft 40 are communicably connected to a network 50.

The vehicle 10 is, for example, an automobile with any level of automated driving but is not limited to this and may be any appropriate vehicle. The vehicle 10 is, for example, a gasoline vehicle, a battery electric vehicle (BEV), a hybrid electric vehicle (HEV), a plug-in hybrid electric vehicle (PHEV), a fuel cell electric vehicle (FCEV), or the like, but is not limited to these. The automation level is, for example, any one of Level 1 to Level 5 according to the level classification defined by the Society of Automotive Engineers (SAE).

The information processing apparatus 20 is a computer such as a server that belongs to a cloud computing system or another type of computing system.

The work vehicle 30 is any appropriate agricultural machine, including a tractor, rice transplanter, or combine, that is capable of driving and following the vehicle 10 or the unmanned aircraft 40 via wireless communication. The number of work vehicles 30 included in the system 1 may be freely set, and the work vehicles 30 may include one or more agricultural machines.

The unmanned aircraft 40 is any appropriate unmanned aircraft, such as an agricultural drone. The number of unmanned aircraft 40 included in the system 1 may be freely set, and the unmanned aircraft 40 may include one or more agricultural drones. The unmanned aircraft 40 may be manually operable according to urgency or necessity. The unmanned aircraft 40 may also be capable of carrying small agricultural machinery.

The network 50 includes the Internet, at least one wide area network (WAN), at least one metropolitan area network (MAN), or any combination thereof. The network 50 may include at least one wireless network, at least one optical network, or any combination thereof. The wireless network is, for example, an ad hoc network, a cellular network, a wireless local area network (LAN), a satellite communication network, or a terrestrial microwave network.

An outline of the present embodiment will be described with reference to FIG. 1. A controller 21 of the information processing apparatus 20 controls the vehicle 10 to drive automatically by communicating with the vehicle 10 via the communication interface 22, the vehicle 10 being capable of towing the work vehicle 30 and of driving automatically on public roads. The term "towing" in the present embodiment does not refer to physically pulling the work vehicle 30 to move it, but rather to guiding the work vehicle 30.

According to the present embodiment, the vehicle 10, which is capable of driving automatically on public roads, tows the work vehicle 30 even in a case in which sensors of the work vehicle 30 are soiled by mud or the like. Technology for causing the work vehicle 30 to drive on public roads can therefore be improved.

Figure 2:
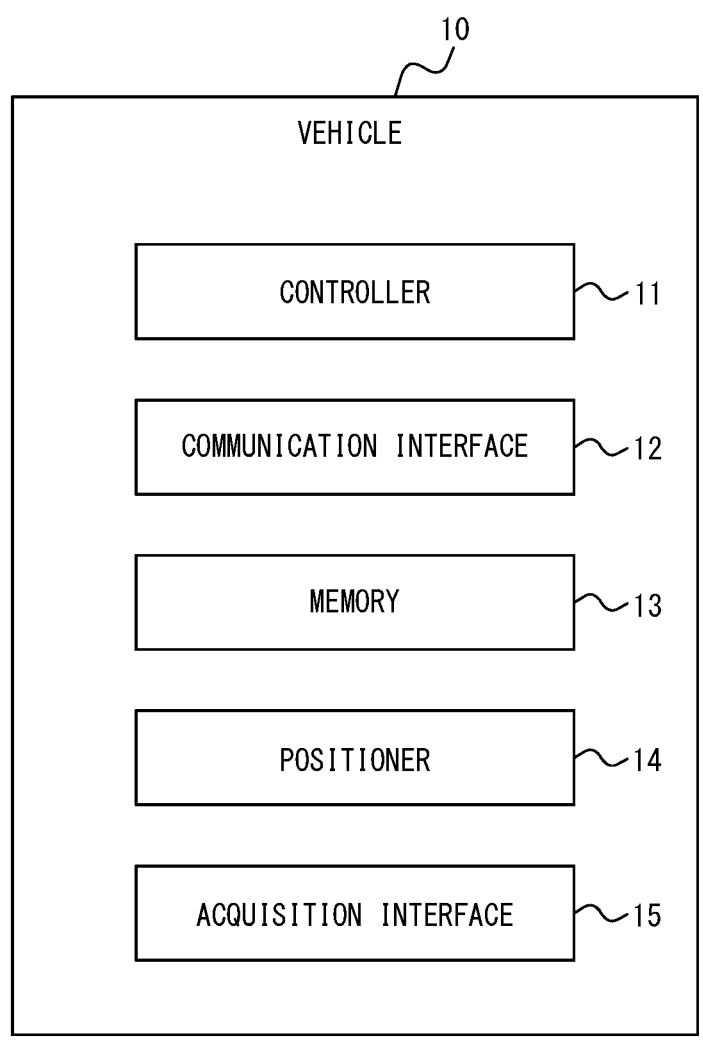
FIG. 2 is a block diagram illustrating a schematic configuration of a vehicle according to the embodiment of the present disclosure.

A configuration of the vehicle 10 according to the present embodiment will be described with reference to FIG. 2.

The vehicle 10 includes a controller 11, a communication interface 12, a memory 13, a positioner 14, and an acquisition interface 15.

The controller 11 includes at least one processor, at least one programmable circuit, at least one dedicated circuit, or any combination thereof. The processor is a general purpose processor such as a central processing unit (CPU) or a graphics processing unit (GPU), or a dedicated processor that is dedicated to specific processing. The programmable circuit is, for example, a field-programmable gate array (FPGA). The dedicated circuit is, for example, an application specific integrated circuit (ASIC). The controller 11 executes processes related to the operations of the vehicle 10 while controlling the components of the vehicle 10.

The communication interface 12 includes at least one interface for communication. The interface for communication is, for example, an interface compliant with a mobile communication standard such as a Long Term Evolution (LTE), the 4th generation (4G) standard, or the 5th generation (5G) standard, an interface compliant with a short-range wireless communication standard such as Bluetooth® (Bluetooth is a registered trademark in Japan, other countries, or both), or a LAN interface. The communication interface 12 receives data to be used for the operations of the vehicle 10 and transmits data obtained by the operations of the vehicle 10.

The memory 13 includes at least one semiconductor memory, at least one magnetic memory, at least one optical memory, or any combination thereof. The semiconductor memory is, for example, random access memory (RAM) or read only memory (ROM). The RAM is, for example, static random access memory (SRAM) or dynamic random access memory (DRAM). The ROM is, for example, electrically erasable programmable read only memory (EEPROM). The memory 13 functions as, for example, a main memory, an auxiliary memory, or a cache memory. The memory 13 stores data to be used for operations of the vehicle 10 and data obtained by the operations of the vehicle 10. In the present embodiment, the data to be used for the operations of the vehicle 10 includes a system program, an application program, a database, map information, and the like.

The positioner 14 includes one or more receivers compliant with any appropriate satellite positioning system. For example, the positioner 14 includes a Global Positioning System (GPS) receiver. The positioner 14 acquires a measured value of the position of the vehicle 10 as the positional information. The positional information includes an address, a latitude, a longitude, an altitude, and the like. The positioner 14 is capable of acquiring positional information on the vehicle 10. The positioner 14 may acquire the positional information on the vehicle 10 continually, regularly, or non-regularly.

The acquisition interface 15 includes one or more sensor modules capable of acquiring information necessary for automatic driving of the vehicle 10 on public roads. Non-limiting examples of the sensor module include speed sensors, acceleration sensors, angular velocity sensors, or steering angle sensors.

Figure 3:
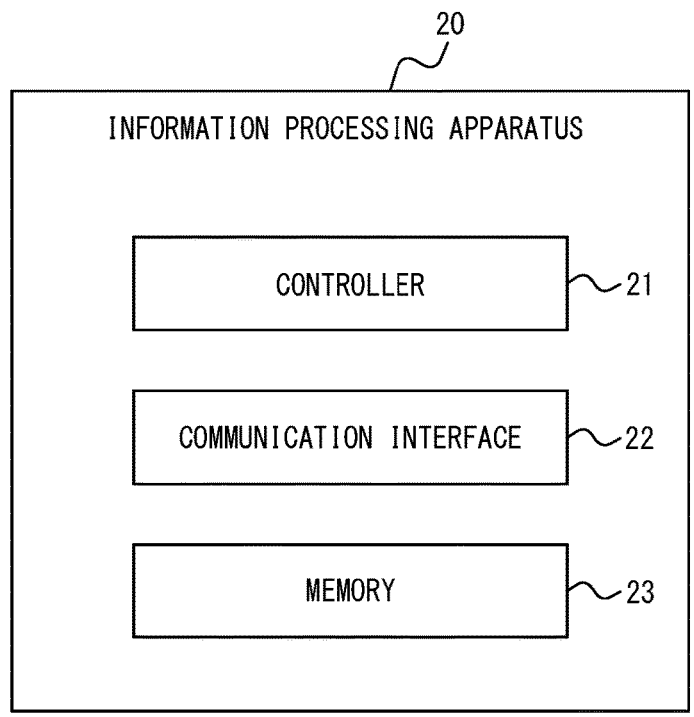
FIG. 3 is a block diagram illustrating a schematic configuration of an information processing apparatus according to the embodiment of the present disclosure.

A configuration of the information processing apparatus 20 according to the present embodiment will be described with reference to FIG. 3.

The information processing apparatus 20 includes the controller 21, a communication interface 22, and a memory 23.

The controller 21 includes at least one processor, at least one programmable circuit, at least one dedicated circuit, or any combination thereof. The processor is a general purpose processor such as a CPU or a GPU, or a dedicated processor that is dedicated to specific processing. The programmable circuit is, for example, an FPGA. The dedicated circuit is, for example, an ASIC. The controller 21 executes processes related to operations of the information processing apparatus 20 while controlling components of the information processing apparatus 20.

The communication interface 22 includes at least one interface for communication. The interface for communication is compliant with, for example, a mobile communication standard, a wired LAN standard, or a wireless LAN standard, but not limited to these, and may be compliant with any communication standard. The communication interface 22 receives data to be used for the operations of the information processing apparatus 20 and transmits data obtained by the operations of the information processing apparatus 20.

The memory 23 includes at least one semiconductor memory, at least one magnetic memory, at least one optical memory, or any combination thereof. The semiconductor memory is, for example, RAM or ROM. The RAM is, for example, SRAM or DRAM. The ROM is, for example, EEPROM. The memory 23 functions as, for example, a main memory, an auxiliary memory, or a cache memory. The memory 23 stores data to be used for the operations of the information processing apparatus 20 and data obtained by the operations of the information processing apparatus 20. In the present embodiment, the data to be used for the operations of the information processing apparatus 20 includes a system program, an application program, a database, map information, and the like.

Figure 4:
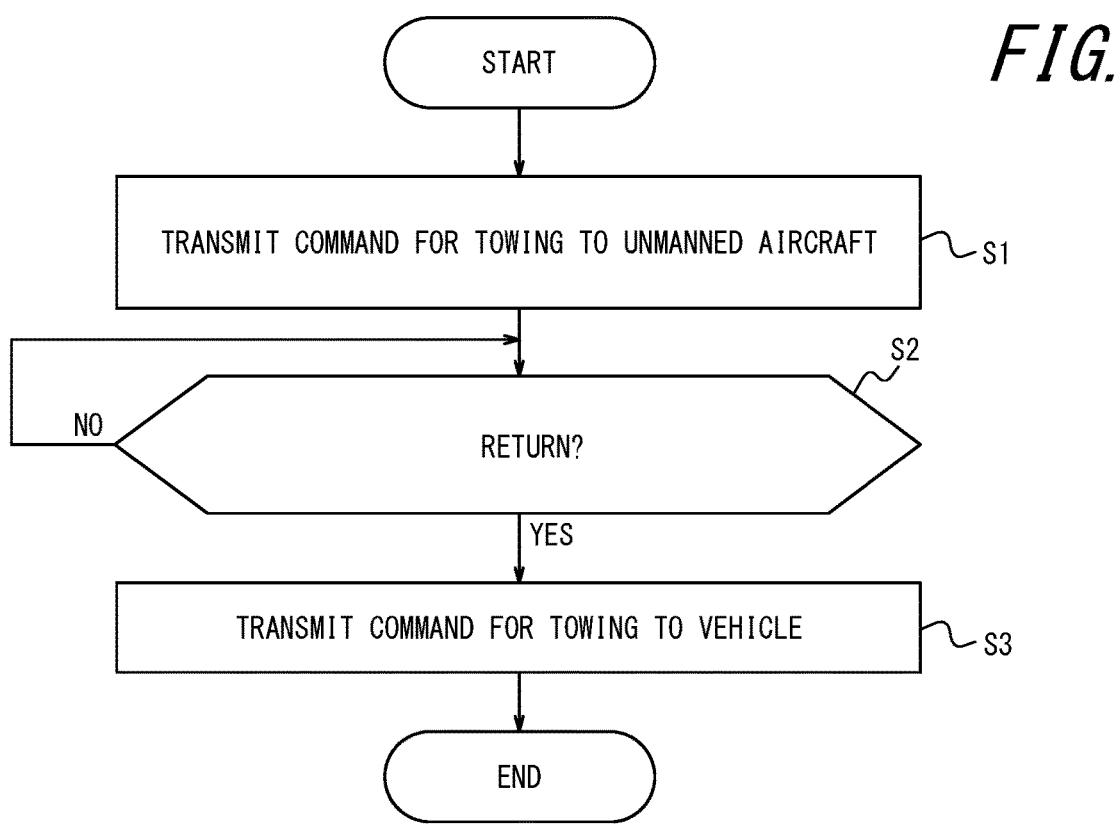
FIG. 4 is a flowchart illustrating operations of the information processing apparatus according to the embodiment of the present disclosure.

Operations of the information processing apparatus 20 according to the present embodiment will be described with reference to FIG. 4. These operations correspond to a method according to an embodiment of the present disclosure.

In the present example, it is assumed that identification information and the like for identifying the work vehicle 30 to be towed is stored in advance in the memory 23 of the information processing apparatus 20. In the present example, the vehicle 10 is capable of carrying an unmanned aircraft that is capable of towing the work vehicle 30. In the present example, the work vehicle 30 is assumed to drive and follow the unmanned aircraft 40 on private roads and the like, other than main roads, from the agricultural land to the waiting area of the vehicle 10 and to drive and follow the vehicle 10 on main roads from the waiting area of the vehicle 10 to the storage shed. Main roads include, but are not limited to, general national roads, prefectural ro ads, and municipal roads on which traffic is equal to or greater than a predetermined value. However, the present disclosure is not limited to this example, and the work vehicle 30 may drive and follow the vehicle 10 from the agricultural land to the storage shed. Instead of a single work vehicle 30, a plurality of work vehicles 30 may drive and follow the vehicle 10. In this case, an agricultural work schedule to be performed by each work vehicle 30 may be stored in advance in the memory 23 of the information processing apparatus 20, and the controller 21 may control the towing of each work vehicle 30 based on the agricultural work schedule.

Step S1: the controller 21 of the information processing apparatus 20 transmits, via the communication interface 22, a command for towing the work vehicle 30 to the unmanned aircraft 40 carried by the vehicle 10.

Specifically, the controller 21 of the information processing apparatus acquires identification information for identifying the work vehicle 30 to be towed from the memory 23 before a work end time specified in advance by the owner of the work vehicle 30 or the like. Such identification information includes, but is not limited to, vehicle body information, image information, positional information, destination information (such as positional information for the storage shed), and owner information for the work vehicle 30. The controller 21 of the information processing apparatus 20 then identifies, based on the identification information, a vehicle 10 located at a distance that is less than a predetermined value from the work vehicle 30 and identifies the unmanned aircraft 40 carried by the vehicle 10. The controller 21 of the information processing apparatus 20 then generates a command for towing the work vehicle 30, including flight path information between the current position of the vehicle 10 and the current position of the work vehicle and information necessary for wireless communication between the work vehicle 30 and the unmanned aircraft 40 in order for the work vehicle 30 to drive and follow behind the unmanned aircraft 40. The controller 21 of the information processing apparatus 20 then transmits, via the communication interface 22, the command for towing to the identified unmanned aircraft 40. As a result, upon receiving the command for towing from the information processing apparatus 20, the unmanned aircraft 40 automatically flies to the current position of the work vehicle 30, pairs with the work vehicle 30 for wireless communication, and then returns to the current position of the vehicle 10 by automatic flight, with the work vehicle 30 following the unmanned aircraft 40.

Step S2: the controller 21 of the information processing apparatus 20 determines whether a return signal of the unmanned aircraft 40 returning to the vehicle 10 is received via the communication interface 22. In a case in which a return signal is received, the process proceeds to step S3. Conversely, in a case in which a return signal is not received, the process waits.

Specifically, the controller 11 of the vehicle 10 generates a return signal upon detecting the return of the unmanned aircraft 40 to the vehicle 10 by any image recognition technique or the like. The controller 11 of the vehicle 10 then transmits the return signal to the information processing apparatus 20 via the communication interface 12. The controller 21 of the information processing apparatus 20 then receives the return signal from the vehicle 10 via the communication interface 22. Instead of receiving the return signal from the vehicle 10 via the communication interface 22, the controller 21 of the information processing apparatus 20 may directly receive the return signal from the unmanned aircraft 40.

Step S3: the controller 21 of the information processing apparatus 20 transmits, via the communication interface 22, a command for towing the work vehicle 30 to the vehicle 10.

Specifically, the controller 21 of the information processing apparatus generates, from the identification information acquired in step S1, the command for towing the work vehicle 30, the command including the travel route information from the current location of the vehicle 10 to the destination of the work vehicle 30 and information necessary for wireless communication (vehicle-to-vehicle communication) between the vehicle 10 and the work vehicle 30 in order for the work vehicle 30 to drive and follow behind the vehicle 10. The controller 21 of the information processing apparatus 20 then transmits, via the communication interface 22, the command for towing to the vehicle 10 identified in step S1. As a result, upon receiving the command for towing from the information processing apparatus 20 via the communication interface 12, the controller 11 of the vehicle 10 causes the vehicle 10 to drive and follow the work vehicle 30 based on the command for towing. The controller 11 of the vehicle 10 automatically drives to the storage shed by controlling the steering, accelerator, brakes, and the like of the vehicle 10 using the information acquired from the positioner 14 and the acquisition interface 15 and the aforementioned travel route information. Driving and following refers to the work vehicle 30 automatically following the vehicle 10 behind the vehicle 10 while maintaining a constant distance between the vehicle 10 and the work vehicle 30.

As described above, the controller 21 of the information processing apparatus 20 according to the present embodiment controls the vehicle 10 to drive automatically by communicating with the vehicle 10 via the communication interface 22, the vehicle 10 being capable of towing the work vehicle 30 and of driving automatically on public roads.

According to this configuration, the vehicle 10, which is capable of driving automatically on public roads, tows the work vehicle 30 even in a case in which sensors of the work vehicle 30 are soiled by mud or the like. Technology for causing the work vehicle 30 to drive on public roads can therefore be improved.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

As a variation, the controller 21 of the information processing apparatus 20 may control the towing of the work vehicle 30 by the unmanned aircraft 40 in a case in which the degree of soiling of a sensor included in the work vehicle 30 (for example, an agricultural sensor) exceeds a predetermined value. In a case in which the degree of soiling of the sensor is equal to or less than a predetermined value, the work vehicle 30 may drive independently (drive automatically) to the standby position of the vehicle 10 using the sensor. The details on towing are as described in the above embodiment.

As a variation, an embodiment in which a general purpose computer functions as the information processing apparatus 20 according to the above embodiment can also be implemented. Specifically, a program in which processes for realizing the functions of the information processing apparatus according to the above embodiment are written may be stored in a memory of a general purpose computer, and the program may be read and executed by a processor. Accordingly, the present disclosure can also be implemented as a program executable by a processor, or a non-transitory computer readable medium storing the program.

Examples of some embodiments of the present disclosure are described below. However, it should be noted that the embodiments of the present disclosure are not limited to these examples.

[Appendix 1] An information processing apparatus comprising a controller and a communication interface, wherein
the controller is configured to control a vehicle to drive automatically by communicating with the vehicle via the communication interface, the vehicle being capable of towing a work vehicle and of driving automatically on public roads.

[Appendix 2] The information processing apparatus according to appendix 1, wherein the controller is configured to control the towing of the work vehicle by the vehicle via the communication interface on a main road.

[Appendix 3] The information processing apparatus according to appendix 1 or 2, wherein
the vehicle is capable of carrying an unmanned aircraft capable of towing the work vehicle, and
the controller is configured to control the towing of the work vehicle by the unmanned aircraft via the communication interface on a road other than the main road.

[Appendix 4] The information processing apparatus according to appendix 3, wherein the controller is configured to control the towing of the work vehicle by the unmanned aircraft in a case in which a degree of soiling of a sensor included in the work vehicle exceeds a predetermined value.

[Appendix 5] The information processing apparatus according to any one of appendices 1 to 4, wherein the towing includes wireless towing.

[Appendix 6] The information processing apparatus according to any one of appendices 1 to 5, wherein the work vehicle includes one or more agricultural machines.

[Appendix 7] The information processing apparatus according to any one of appendices 3 to 6, wherein the unmanned aircraft includes one or more agricultural drones.

[Appendix 8] A method to be executed by an information processing apparatus, the method comprising:
controlling a vehicle to drive automatically by communicating with the vehicle, the vehicle being capable of towing a work vehicle and of driving automatically on public roads.

[Appendix 9] The method according to appendix 8, further comprising controlling the towing of the work vehicle by the vehicle on a main road.

[Appendix 10] The method according to appendix 8 or 9, wherein
the vehicle is capable of carrying an unmanned aircraft capable of towing the work vehicle, and
the method further comprises controlling the towing of the work vehicle by the unmanned aircraft on a road other than the main road.

[Appendix 11] The method according to appendix 10, further comprising controlling the towing of the work vehicle by the unmanned aircraft in a case in which a degree of soiling of a sensor included in the work vehicle exceeds a predetermined value.

[Appendix 12] The method according to any one of appendices 8 to 11, wherein the towing includes wireless towing.

[Appendix 13] The method according to any one of appendices 8 to 12, wherein the work vehicle includes one or more agricultural machines.

[Appendix 14] The method according to any one of appendices 10 to 13, wherein the unmanned aircraft includes one or more agricultural drones.

[Appendix 15] A non-transitory computer readable medium storing a program configured to cause a computer to perform operations comprising:
controlling a vehicle to drive automatically by communicating with the vehicle, the vehicle being capable of to wing a work vehicle and of driving automatically on public roads.

[Appendix 16] The non-transitory computer readable medium according to appendix 15, wherein the operations further comprise controlling the towing of the work vehicle by the vehicle on a main road.

[Appendix 17] The non-transitory computer readable medium according to appendix 15 or 16, wherein
the vehicle is capable of carrying an unmanned aircraft capable of towing the work vehicle, and
the operations further comprise controlling the towing of the work vehicle by the unmanned aircraft on a road other than the main road.

[Appendix 18] The non-transitory computer readable medium according to appendix 17, wherein the operations further comprise controlling the towing of the work vehicle by the unmanned aircraft in a case in which a degree of soiling of a sensor included in the work vehicle exceeds a predetermined value.

[Appendix 19] The non-transitory computer readable medium according to any one of appendices 15 to 18, wherein the work vehicle includes one or more agricultural machines.

[Appendix 20] The non-transitory computer readable medium according to any one of appendices 17 to 19, wherein the unmanned aircraft includes one or more agricultural drones.

The invention claimed is:

1. An information processing apparatus comprising:
a processor; and
a communication interface configured to communicate with a vehicle and an unmanned aircraft which are configured to automatically tow a work vehicle, wherein
the processor is configured to control the towing of the work vehicle by:
based on a degree of soiling of a sensor included in the work vehicle exceeding a predetermined value, transmitting a first command via the communication interface to the unmanned aircraft and a second command via the communication interface to the vehicle, the unmanned aircraft, in response to the first command, automatically flying and towing the work vehicle on a non-public road from a work place of the work vehicle to a waiting place of the vehicle, and the vehicle, in response to the second command, automatically driving and towing the work vehicle on a public road from the waiting place of the vehicle to a first place, and
based on the degree of soiling of the sensor included in the work vehicle being equal to or less than the predetermined value, transmitting the second command via the communication interface to the vehicle without transmitting the first command via the communication interface to the unmanned aircraft, so that the work vehicle automatically drives using the sensor on the non-public road from the work place of the work vehicle to the waiting place of the vehicle, and the vehicle, in response to the second command, automatically drives and tows the work vehicle on the public road from the waiting place of the vehicle to the first place.

2. The information processing apparatus according to claim 1, wherein
the vehicle is configured to carry the unmanned aircraft.

3. The information processing apparatus according to claim 1, wherein the towing includes wireless towing.

4. The information processing apparatus according to claim 1, wherein the work vehicle includes one or more agricultural machines.

5. The information processing apparatus according to claim 1, wherein the unmanned aircraft includes one or more agricultural drones.

6. A method executed by an information processing apparatus having a processor and a communication interface configured to communicate with a vehicle and an unmanned aircraft which are configured to automatically tow a work vehicle, the method comprising:
based on a degree of soiling of a sensor included in the work vehicle exceeding a predetermined value, controlling the unmanned aircraft by transmitting a first command via the communication interface to the unmanned aircraft and controlling the vehicle by transmitting a second command via the communication interface to the vehicle, the unmanned aircraft, in response to the first command, automatically flying and towing the work vehicle on a non-public road from a work place of the work vehicle to a waiting place of the vehicle, and the vehicle, in response to the second command, automatically driving and towing the work vehicle on a public road from the waiting place of the vehicle to a first place, and
based on the degree of soiling of the sensor included in the work vehicle being equal to or less than the predetermined value, controlling the vehicle by transmitting the second command via the communication interface to the vehicle without transmitting the first command via the communication interface to the unmanned aircraft, so that the work vehicle automatically drives using the sensor on the non-public road from the work place of the work vehicle to the waiting place of the vehicle, and the vehicle, in response to the second command, automatically drives and tows the work vehicle on the public road from the waiting place of the vehicle to the first place.

7. The method according to claim 6, wherein
the vehicle is configured to carry the unmanned aircraft.

8. The method according to claim 6, wherein the towing includes wireless towing.

9. The method according to claim 6, wherein the work vehicle includes one or more agricultural machines.

10. The method according to claim 6, wherein the unmanned aircraft includes one or more agricultural drones.

11. A non-transitory computer readable medium storing a program configured to cause a computer having a processor and a communication interface configured to communicate with a vehicle and an unmanned aircraft which are configured to automatically tow a work vehicle, to perform operations comprising:
based on a degree of soiling of a sensor included in the work vehicle exceeding a predetermined value, controlling the unmanned aircraft by transmitting a first command via the communication interface to the unmanned aircraft and controlling the vehicle by transmitting a second command via the communication interface to the vehicle, the unmanned aircraft, in response to the first command, automatically flying and towing the work vehicle on a non-public road from a work place of the work vehicle to a waiting place of the vehicle, and the vehicle, in response to the second command, automatically driving and towing the work vehicle on a public road from the waiting place of the vehicle to a first place, and
based on the degree of soiling of the sensor included in the work vehicle being equal to or less than the predetermined value, controlling the vehicle by transmitting the second command via the communication interface to the vehicle without transmitting the first command via the communication interface to the unmanned aircraft, so that the work vehicle automatically drives using the sensor on the non-public road from the work place of the work vehicle to the waiting place of the vehicle, and the vehicle, in response to the second command, automatically drives and tows the work vehicle on the public road from the waiting place of the vehicle to the first place.

12. The non-transitory computer readable medium according to claim 11, wherein
the vehicle is configured to carry the unmanned aircraft.

13. The non-transitory computer readable medium according to claim 11, wherein the work vehicle includes one or more agricultural machines.

14. The non-transitory computer readable medium according to claim 11, wherein the unmanned aircraft includes one or more agricultural drones.

15. The information processing apparatus according to claim 1, wherein the first place is a storage shed for storing the work vehicle.

16. The information processing apparatus according to claim 1, wherein the processor is further configured to, based on the degree of soiling of the sensor included in the work vehicle exceeding the predetermined value, transmit the second command via the communication interface to the vehicle after transmitting the first command via the communication interface to the unmanned aircraft and receiving a return signal via the communication interface from the vehicle or the unmanned aircraft, the return signal indicating that the unmanned aircraft has returned to the waiting place of the vehicle from the work place of the work vehicle.

17. The information processing apparatus according to claim 2, wherein the processor is further configured to
acquire identification information for identifying the work vehicle, the identification information including positional information of the work vehicle,
identify, based on the identification information, the vehicle located at a distance that is less than a predetermined value from a current position of the work vehicle, and
identify the unmanned aircraft carried by the vehicle.

18. The method according to claim 6, wherein the first place is a storage shed for storing the work vehicle.

19. The method according to claim 6, wherein based on the degree of soiling of the sensor included in the work vehicle exceeding the predetermined value, the transmitting of the second command via the communication interface to the vehicle is performed after transmitting the first command via the communication interface to the unmanned aircraft and receiving a return signal via the communication interface from the vehicle or the unmanned aircraft, the return signal indicating that the unmanned aircraft has returned to the waiting place of the vehicle from the work place of the work vehicle.

20. The method according to claim 7, further comprising:
acquiring identification information for identifying the work vehicle, the identification information including positional information of the work vehicle;
identifying, based on the identification information, the vehicle located at a distance that is less than a predetermined value from a current position of the work vehicle; and
identifying the unmanned aircraft carried by the vehicle.

* * * * *